May 15, 1962   S. B. CAMPBELL   3,034,321
FLEXIBLE COUPLING
Filed May 24, 1960

INVENTOR.
Sherman B Campbell
BY Ralph Hammar
Attorney

United States Patent Office 3,034,321
Patented May 15, 1962

3,034,321
FLEXIBLE COUPLING
Sherman B. Campbell, Erie, Pa., assignor to Lord Manufacturing Company, Erie, Pa., a corporation of Pennsylvania
Filed May 24, 1960, Ser. No. 31,442
2 Claims. (Cl. 64—11)

This invention is a flexible coupling in which the driving and driven hubs have radially outwardly extending flanges bonded to opposite ends of a sleeve of flexible material and extend toward each other within the sleeve so as to obtain maximum flexibility with minimum axial length. To facilitate molding, one of the flanges comprises a radially extending ring which has a pin connection to its hub.

Figure 1:
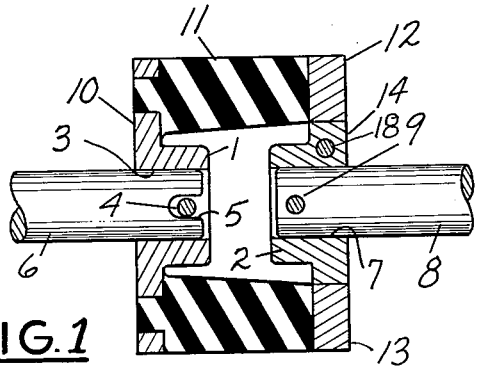
Figure 3:
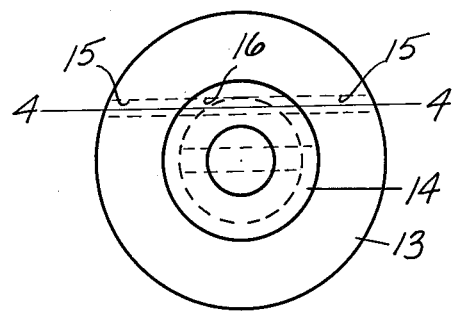
Figure 2:
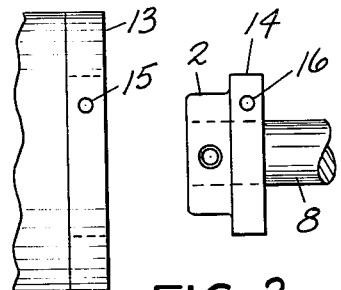
Figure 5:
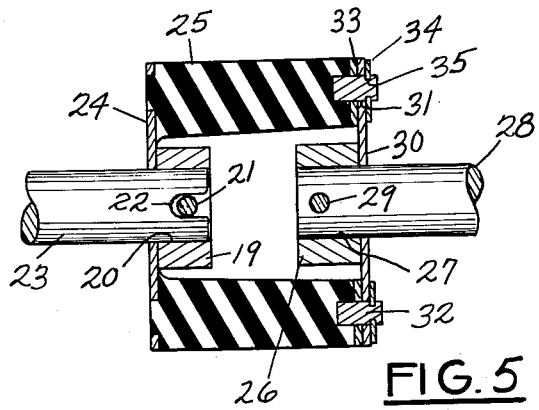
Figure 4:
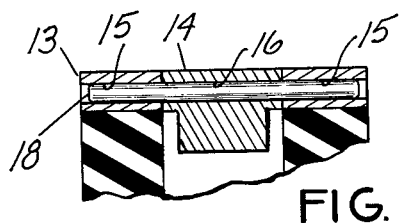
Figure 6:
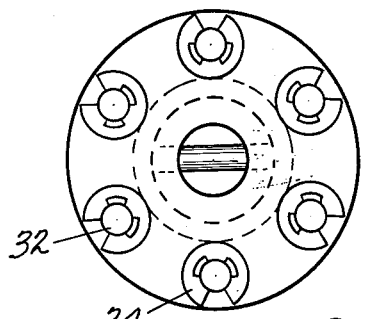
Figure 7:
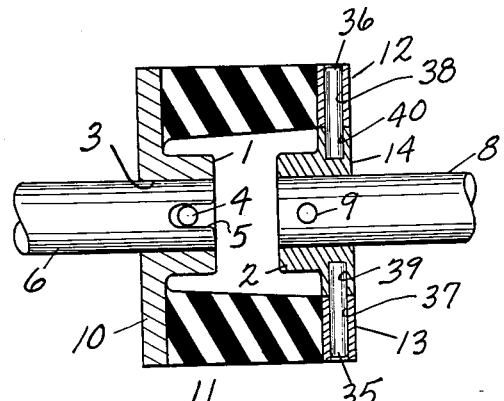

In the drawing, FIG. 1 is a longitudinal section of a flexible coupling, FIG. 2 is an exploded view of one end of the coupling, FIG. 3 is an end view, FIG. 4 is a section on line 4—4 of FIG. 3, FIG. 5 is a longitudinal section through a modification, FIG. 6 is an end view of the modification, and FIG. 7 is a longitudinal section through another modification.

In the drawing, 1 and 2 indicate hubs, one being the driving and the other the driven member. The hub 1 has a bore 3 in which is fixed a diametrically extending pin 4 for receiving the slotted end 5 of a shaft 6. The hub 2 has a bore 7 receiving a shaft 8 which is fastened to the hub by a pin 9. Other expedients may be used to connect the shafts to the hubs.

Integral with the hub 1 is a radially outwardly extending flange 10 bonded to one end of a sleeve 11 of rubber or like flexible material. At the opposite end the sleeve 11 is bonded to a radially outwardly extending flange 12 fixed to the hub 2. The hubs 1 and 2 extend toward each other within the sleeve and are spaced from the bore of the sleeve so that the full length of the sleeve between the flanges 10 and 12 is available to accommodate misalignment. If the hubs 1 and 2 were not spaced from the bore of the sleeve, the effective length of the sleeve would be the section between the adjacent ends of the hubs.

To facilitate molding, the flange 12 is not integral with the hub 2. The flange comprises a radially extending ring 13 of radial width equal to the thickness of the sleeve. The ring is telescoped over a flange 14 integral with the hub 2. The flange 14 and ring 13 are assembled so that chordwise extending holes 15 and 16 in the ring 13 and flange 14 are in alignment and the parts are then fixed together by a pin 18. When the pin 18 is in place, the parts are fixed together so that the flange 12 is rigid with the hub 2.

In the modification shown in FIGS. 5 and 6, the principal difference is in the manner of assembly. At one end of the coupling is a hub 19 having a bore 20 in which is fixed a diametrically extending pin 21 receiving the slotted end 22 of a shaft 23. The hub 19 is fixed to a radially outwardly extending flange 24 bonded to one end of a sleeve 25 of rubber or like flexible material. At the other end of the coupling is a hub 26 having a bore 27 receiving a shaft 28 fixed thereto by a pin 29. The hub 26 is fixed to a radially outwardly extending flange 30 having a plurality of holes 31 receiving axially extending pins 32 fixed in a radially extending ring 33 bonded to the opposite end of the sleeve 25. The flange 30 and the ring 33 are rigidly fixed together by spring washers 34 snapped into grooves 35 in the outer ends of the pins 32. When assembled, the hub flange and the ring 33 are rigidly fixed together and function in the same manner as the flange 24.

The modification shown in FIG. 7 is similar to that shown in FIGS. 1 and 4 and corresponding parts are indicated by the same reference numerals. The difference is in the manner in which the flange 14 and ring 13 are fixed together. This is accomplished by two radial pins 35 and 36 respectively received in radial holes 37 and 38 in the ring 13 and in radial holes 39 and 40 in the flange 14 integral with the hub 2. In assembly, the hub 2 is inserted within the ring 13 until the holes 35, 36, 39, 40 are lined up. The parts are then fixed together by the pins 35, 36 and thereafter have the same mechanical function as the flange 10 integral with the hub 1.

What is claimed as new is:

1. A flexible coupling comprising driving and driven hubs extending toward each other, radially outwardly extending flanges at the ends of the hubs remote from each other, a sleeve of flexible material extending between said flanges, said sleeve having an inner surface surrounding and in spaced relation to the hubs and having ends bonded to said flanges, the flange on one of the hubs comprising a ring bonded to said sleeve, said one hub having a part telescoped within said ring, and said ring and said part having aligned holes receiving a fastening member.

2. A flexible coupling comprising driving and driven hubs extending toward each other, radially outwardly extending flanges at the ends of the hubs remote from each other, a sleeve of flexible material extending between said flanges, said sleeve having an inner surface surrounding and in spaced relation to the hubs and having ends bonded to said flanges, the flange on one of the hubs comprising a ring bonded to said sleeve, said one hub having a part telescoped within said ring, said ring and said part having aligned holes extending chordwise of the ring, and a fastening member in said holes.

References Cited in the file of this patent
UNITED STATES PATENTS

| | | |
|---|---|---|
| 1,160,462 | Taylor | Nov. 16, 1915 |
| 1,790,516 | Williams | Jan. 27, 1931 |
| 2,172,707 | Julien | Sept. 12, 1939 |
| 2,186,305 | Orr | Jan. 9, 1940 |
| 2,444,904 | Worley | July 6, 1948 |
| 2,848,884 | Maude | Aug. 26, 1958 |

FOREIGN PATENTS

| | | |
|---|---|---|
| 478,101 | Great Britain | Jan. 13, 1938 |